United States Patent [19]
Kayahara

[11] 3,872,763
[45] Mar. 25, 1975

[54] CIRCULAR SAW
[75] Inventor: Isao Kayahara, Tokyo, Japan
[73] Assignee: Ihara Koatsu Tsugite Kogyo Kabushiki Kaisha, Tokyo, Japan
[22] Filed: Jan. 24, 1974
[21] Appl. No.: 436,308

[30] Foreign Application Priority Data
Feb. 16, 1973 Japan.............................. 48-18339

[52] U.S. Cl.................................. 83/835, 83/676
[51] Int. Cl............................................. B27b 33/08
[58] Field of Search ............ 83/835, 839, 840, 841, 83/663, 676

[56] References Cited
UNITED STATES PATENTS
1,083,645    1/1914    Wettstein.............................. 83/835
1,723,843    8/1929    Chapin................................. 83/835

OTHER PUBLICATIONS
Jenkins, "Recent Developments in Sawmill Research," Timber in Canada, April, 1961, pp. 52–56.

*Primary Examiner*—Willie G. Abercrombie
*Attorney, Agent, or Firm*—Ladas, Parry, Von Gehr, Goldsmith & Deschamps

[57] ABSTRACT

A series of apertures in an annular configuration are formed in the blade of a circular saw along but slightly inward from its toothed periphery in order to define a plurality of relatively narrow strips interconnecting the circumferential edge portion and the inside portion of the blade. These interconnecting strips are arranged at approximately equal spacings from one to the next and are inclined substantially in the same direction as that of the sloping of the teeth on the periphery of the blade. By thus substantially isolating the edge portion from the inside portion of the blade, the frictional heat produced in its toothed periphery is almost totally prevented from being transmitted to the inside portion, which is thereby protecting against deformation resulting from thermal expansion.

2 Claims, 3 Drawing Figures

CIRCULAR SAW

BACKGROUND OF THE INVENTION

This invention relates generally to cutting tools and particularly to saws. More specifically, the invention is directed to improvement concerning the blade of a circular saw.

It is well known that the teeth of a saw are usually "set" alternately in opposite lateral directions so that the slot or slit which is made by the saw will be slightly wider than the thickness of the blade. This alternate setting of the teeth prevents the blade from binding in the slot, and as the teeth are protected against any inordinately high frictional resistance, their thermal expansion is minimized. As a consequence, if the heat produced by friction is comparatively low, all such heat will be dissipated simply as the teeth become increasingly angled from the plane of the saw blade due to their own thermal expansion.

However, in the case of a circular saw in particular, and especially when its blade is revolved at high speed, the friction between blade and work is usually such that not only the teeth but the entire circumferential edge portion of the blade is caused to expand thermally. Such thermal expansion on the inside of the teeth can result in the undulatory deformation of the blade, which in turn causes the additional generation of heat as the undulating blade inevitably contacts the surfaces of the material being cut. Moreover, the direction in which the cutting force of the blade is exerted may be displaced instantaneously, thereby preventing the formation of a straight cut. The cutting operation is thus rendered highly troublesome for the workman.

It should also be taken into consideration that such excessive friction between blade and work can further cause deformation of the teeth or irregularity in their setting. The blade will then "chatter", and so-called "chatter marks" may be formed on the surfaces of the work. These irregular or roughened surfaces are often required to be finished by an additional process of planing operation involving the use of a smoothing plane or the like.

As may now be understood, all the listed deficiencies of the prior art circular saw blade arise from its excessive thermal expansion due to friction, especially at its teeth and neighboring edge portion. Hence, in order to obtain smooth cut surfaces by use of a circular saw, some effective measure must be taken whereby the teeth and edge portion of its blade is protected against distortion resulting from thermal expansion.

SUMMARY OF THE INVENTION

It is, therefore, an object of this invention to provide a circular saw of novel and improved configuration such that the saw blade is subject to no substantial deformation due to thermal expansion and is thus successfully prevented from chattering.

Another object of the invention is to provide a circular saw of such configuration that the heat produced by friction in the teeth of the blade is dissipated in a manner giving rise to no excessive deflection in the setting of the teeth, so that the slot made thereby in a piece of material can be approximately of the same width as that of the teeth.

Yet another object of the invention is to provide a circular saw of extremely simple and inexpensive construction which is nevertheless capable of providing such a smooth cut surface that no additional planing operation is required when the saw is used for woodworking purposes.

With these objects in view and the other objects hereinafter set forth, this invention provides a circular saw having a series of apertures formed in an annular arrangement along the toothed periphery of its disclike blade in such a manner that a plurality of relatively narrow strips are left with approximately equal spacing between the edge portion and the inside portion of the blade. Desirably, these strips are inclined substantially in the same direction as that of the inclination of the teeth on the periphery of the blade.

By this novel configuration of the circular saw blade in accordance with the inventive concepts, the inside portion of the blade as defined by the series of apertures can be substantially isolated from any undesirable effects resulting from the frictional production of heat at the teeth of the blade. Furthermore, the thermal expansion of the teeth, edge portion, and interconnecting strips of the blade takes place in such a manner as to produce no undesirable distortion or deformation in these parts.

The features which are believed to be novel and characteristic of this invention are set forth with particularity in the appended claims. The invention itself, however, both as to its construction and mode of operation, together with the further objects and advantages thereof, will be best understood from the following description taken in conjunction with the accompanying drawings which illustrate, by way of example only, a preferred embodiment of the invention and in which like reference numerals denote like parts throughout the several views.

BRIEF DESCRIPTION F THE DRAWINGS OF

DETAILED DESCRIPTION

Figure 1:
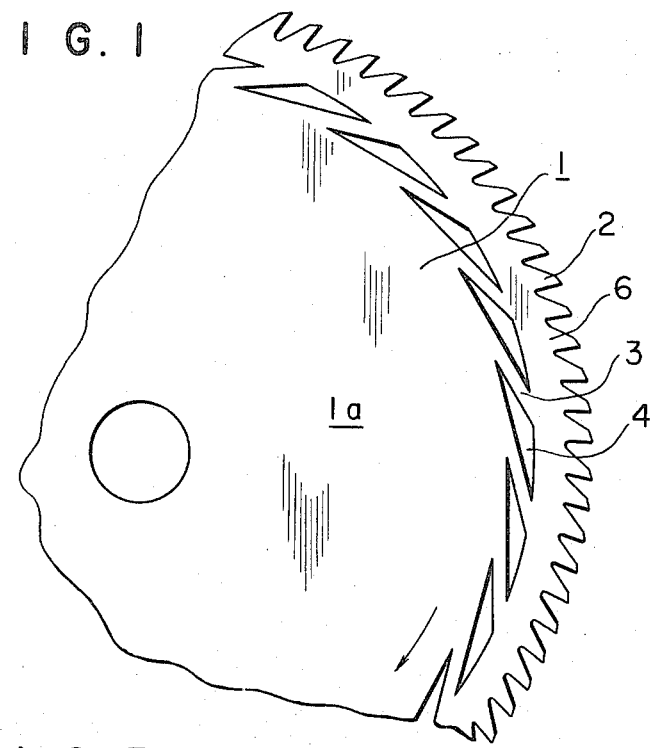
FIG. 1 is a fragmentary side elevational view of a circular saw constructed according to the principles of this invention.
Figure 2:
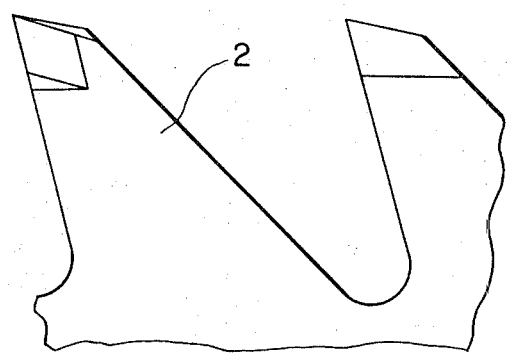
FIG. 2 is an enlarged fragmentary side elevational view showing the teeth of the circular saw of FIG. 1 in more detail.

The novel concepts of this invention are perhaps best embodied in a circular saw blade 1 illustrated in FIG. 1. The blade 1 can be in the form of a thin steel disc carrying an endless series of conventional teeth 2 on its periphery as illustrated fragmentarily on an enlarged scale in FIG. 2. According to the invention, a series of apertures 4 are formed in the blade 1 in an annular configuration along and slightly inward from its toothed periphery, in such a fashion that a plurality of relatively narrow strips 3 are left at approximately equal spacings between the inside portion 1a of the blade 1 and its edge portion 6. It is necessary, or at least preferable, that these interconnecting strips 3 be inclined substantially in the same direction as that of the sloping of the teeth 2.

Figure 3:
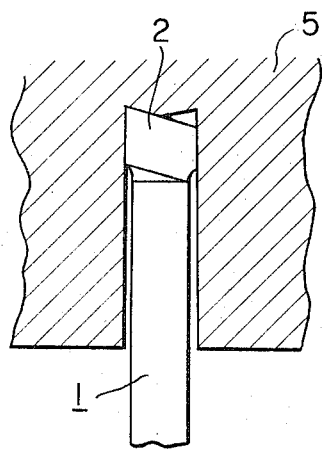
FIG. 3 is fragmentary sectional view for a description of the mode of operation of the circular saw of FIGS. 1 and 2.

The preferred embodiment of the invention being shaped as hereinabove described, the blade 1 may be revolved in the usual manner to make a cut in a workpiece 5 as illustrated by way of example in FIG. 3. Due to the friction thus exerted between the blade 1 and the workpiece 5, heat is first produced at the tips of the teeth 2 and gradually propagates throughout the entire edge portion 6. Since this edge portion is substantially isolated from the inside 1a portion of the blade 1 by the series of apertures 4, the resulting thermal expansion of the edge portion 6 takes place principally in the form of substantial elongation of its circumference. The interconnecting strips 3 also increase in length due to the propagation of frictional heat from the edge portion 6, thereby aiding in the substantial elongation of its circumference.

In the event that this longitudinal thermal expansion of the interconnecting strips 3 fails to match the elongation in circumference of the edge portion 6, the strips will still be subject to a force tending to pull the same outwardly of the blade 1 due to its revolution. It will therefore be appreciated that the force tending to pull the edge portion 6 centrally toward the blade 1 does not substantially hamper the elongation of its circumference.

In this manner the heat first produced in the teeth 2 results ultimately in the expansion of the edge portion 6 and of the interconnecting strips 3 in their circumferential and longitudinal directions, respectively. The interconnecting strips 3 are so small in size compared with the overall size of the blade 1 that only a minimum amount of heat is transmitted therethrough from the edge portion 6 to the inside portion 1a of the blade 1. It will thus be apparent that no appreciable deformation takes place in the inside portion 1a of the blade 1 due to the frictional heat of its teeth 2.

While it will be apparent that the preferred embodiment of the invention herein disclosed is calculated to fulfill the objects above stated, it will be understood that the invention is susceptible to modifications, substitutions or changes within the usual knowledge of the specialists.

What is claimed is:

1. In a circular saw having a blade in the form of a disc made up of a circular inside portion, a peripheral edge portion having a small radial width and carrying cutting teeth about its entire periphery, and means interconnecting said inside portion and said edge portion in a manner to prevent substantial heat transfer from said edge portion to said inside portion:

the improvement wherein said interconnecting means comprises a series of narrow strips integral with and interconnecting said inside portion and said edge portion and disposed in an annular arrangement with equal spacings therebetween, said strips being inclined substantially in a circumferential direction of said peripheral edge portion and being defined between apertures formed in said disc so as to leave said strips between said inside portion and said edge portion.

2. The improvement as recited in claim 1, wherein said strips are inclined substantially in the same direction as that of the inclination of said teeth.

* * * * *